United States Patent [19]
Hamilton

[11] Patent Number: 5,218,636
[45] Date of Patent: Jun. 8, 1993

[54] DIAL PULSE DIGIT DETECTOR
[75] Inventor: Chris A. Hamilton, Montclair, N.J.
[73] Assignee: Dialogic Corporation, Parsippany, N.J.
[21] Appl. No.: 665,970
[22] Filed: Mar. 7, 1991
[51] Int. Cl.⁵ .............................................. H04M 3/00
[52] U.S. Cl. ..................................... 379/386; 379/286
[58] Field of Search ........................ 379/386, 286, 287

[56] References Cited
U.S. PATENT DOCUMENTS

| | | | |
|---|---|---|---|
| 3,935,392 | 1/1976 | Smith et al. | 379/386 |
| 4,868,873 | 9/1989 | Kamil | 379/386 |
| 4,944,001 | 7/1990 | Kizuik et al. | 379/386 |

FOREIGN PATENT DOCUMENTS 0226325 6/1987 European Pat. Off. ............ 379/386

Primary Examiner—James L. Dwyer
Assistant Examiner—Paul A. Fournier
Attorney, Agent, or Firm—Michael B. Einschlag

[57] ABSTRACT

Method and apparatus for detecting and identifying dial pulse digits in a telephone signal. An embodiment of the inventive method includes the steps of: detecting a dial pulse "0" digit; analyzing the dial pulse "0" digit to determine a predetermined set of data to provide a template which is characteristic of the dial pulse "0" digit; detecting a further dial pulse digit; analyzing the further dial pulse digit to determine a predetermined set of data which is characteristic of the further dial pulse digit; and comparing the predetermined set of data of the further dial pulse digit with the template to identify the further dial pulse digit.

12 Claims, 12 Drawing Sheets

FIG. 4B

1. SET: TMP.WID = CNT-SIL
        TMP.LEV = LOCMAX
        TMP.ZX  = ZX
        TMP.CLK = CLKCNT-SIL

2. SET: CNT = SIL
        SIL = 0
        ZX  = 0
        CLKCNT = 0

3. IF (ZFLG = 1 AND DIGMAX < LOCMAX)
   SET: DIGMAX = LOCMAX AND
   SET: THRESH = DIGMAX/TFAC
        HOWEVER IF THRESH < MINERG
              SET THRESH = MINERG

4. SET LOCMAX = CURRENT SAMPLE
                 AMPLITUDE

5. IF (TMP.CLK > CLKMAX) GO TO FIG. 4C
                              WITH ZFLAG

6. IF (MAGFLG = 0) SET CLICK = 0

RETURN

FIG. 4C

1. IF (ZFLG = 1) SET THRESH = MINERG;
                 SET LOCMAX = 0
                 SET DIGMAX = 0

2. GENERATE AN INTERRUPT
   FOR MICROPROCESSOR 50
   TO HAVE IT JUMP TO FIG. 5G

```
IF (DIGR > DIGRMN [DIGIT -1] AND
   DIGR < DIGRMX [DIGIT-1] AND
   RERG > RERGMN [DIGIT-1] AND
   RERG < RERGMX [DIGIT-1] AND
   RZX > RZXMN [DIGIT-1] AND
   RZX < RZXMX [DIGIT-1] AND
   DIFCLK > DIFCLKMN [DIGIT-1] AND
   DIFCLK < DIFCLKMX [DIGIT-1] )    RETURN CONTROL
                                       WITH A "1"

OTHERWISE RETURN CONTROL
              WITH A "0"

RETURN
```

SET: EDGE = -1
     STARTFLG = 0

TO 510 OF FIG. 5A

DIAL PULSE DIGIT DETECTOR

TECHNICAL FIELD OF THE INVENTION

The present invention pertains to method and apparatus for detecting and identifying dial pulse digits and, in particular, to method and apparatus for detecting and identifying dial pulse digits generated by a telephone.

BACKGROUND OF THE INVENTION

A large number of telecommunications systems have been, and are being, introduced into the marketplace which provide service to a customer by means of customer-interaction with the system via the customer's telephone. In operation, many such interactive systems provide voice commands and queries to the customer who responds by using a telephone set to generate tones which are detected, identified, and analyzed by the interactive system. As one can readily appreciate, such an interactive system requires its customers to have access to telephones, such as Touchtone ® telephones, which can produce tones. However, there are a large number customers who do not have access to such telephones and, instead, only have access to telephones which generate dial pulses to interact with a telephone network. Such telephones generate dial pulse digits to indicate, for example, the telephone number of a called party. Dial pulse digits are comprised of a train of audible clicks which are separated from one another by periods of silence. For example, in a typical dial pulse digit, each click is approximately 1 msec to 33 msec in length and each period of silence is approximately 6 msec to 33 msec in length. Telephones that generate dial pulse digits cannot generally be used to interact with telecommunications systems that require customers to respond by generating tones.

In light of the above, there is a need in the art for method and apparatus for detecting and identifying dial pulse digits so that, among other reasons, telecommunications systems which utilize such method and apparatus can interact with customers having access to telephone sets which generate dial pulse digits. Further, there is a need for such method and apparatus which can detect and identify dial pulse digits which are contained in a digital or an analog signal which is transmitted, for example, over the public service telephone network ("PSTN").

SUMMARY OF THE INVENTION

Embodiments of the present invention advantageously satisfy the above-identified need in the art by providing method and apparatus for detecting and identifying dial pulse digits in an input signal.

An embodiment of the present invention comprises the steps of: detecting a predetermined dial pulse digit—for example, a dial pulse "0" digit; analyzing the predetermined dial pulse digit to determine a predetermined set of data to provide a template which is characteristic of the predetermined dial pulse digit; detecting a further dial pulse digit: analyzing the further dial pulse digit to determine a further predetermined set of data which is characteristic of the further dial pulse digit; and comparing the predetermined set of data of the further dial pulse digit with the template to identify the further dial pulse digit.

Thus, embodiments of the present invention analyze an input signal, for example, a telephone signal which is generated by a telephone which generates dial pulse digits, to detect and identify the dial pulse digits. In particular, in a preferred embodiment of the present invention, if the input signal is an analog signal, amplitude samples of the input signal are taken at a predetermined sampling rate and the samples are converted into a linear pulse code modulated (PCM) digital format. On the other hand, in the preferred embodiment of the present invention, if the input signal is a digital signal, the digital signal amplitude values are transformed into a linear PCM digital format if the input signal is not already thusly encoded, i.e., if the input digital signal was encoded using a u-law or an A-law PCM format, the digital signal values are converted into a linear PCM format.

Further, also in accordance with the preferred embodiment of the present invention, the input signal is broken into short time duration segments for purposes of analysis, which short time duration segments are referred to as frames. In particular, in the preferred embodiment, a frame is comprised of a predetermined number of samples of an input analog signal or a predetermined number of values of an input digital signal, all in linear PCM format.

As an example of the above, in the preferred embodiment of the present invention for use in analyzing an analog signal which is transmitted over the public service telephone network ("PSTN") which has a 4000 Hz bandwidth, the analog signal is sampled, in accordance with the well-known Nyquist criterion, at least 8000 times/sec and the predetermined number of samples or values per frame is chosen to be 50.

BRIEF DESCRIPTION OF THE DRAWING

A complete understanding of the present invention may be gained by considering the following detailed description in conjunction with the accompanying drawing, in which:

FIGS. 4A–4C show a flow chart of a program which directs the operation of a digital signal processor (DSP) which comprises the preferred embodiment of the inventive apparatus shown in FIG. 1.

DETAILED DESCRIPTION

Figure 1:
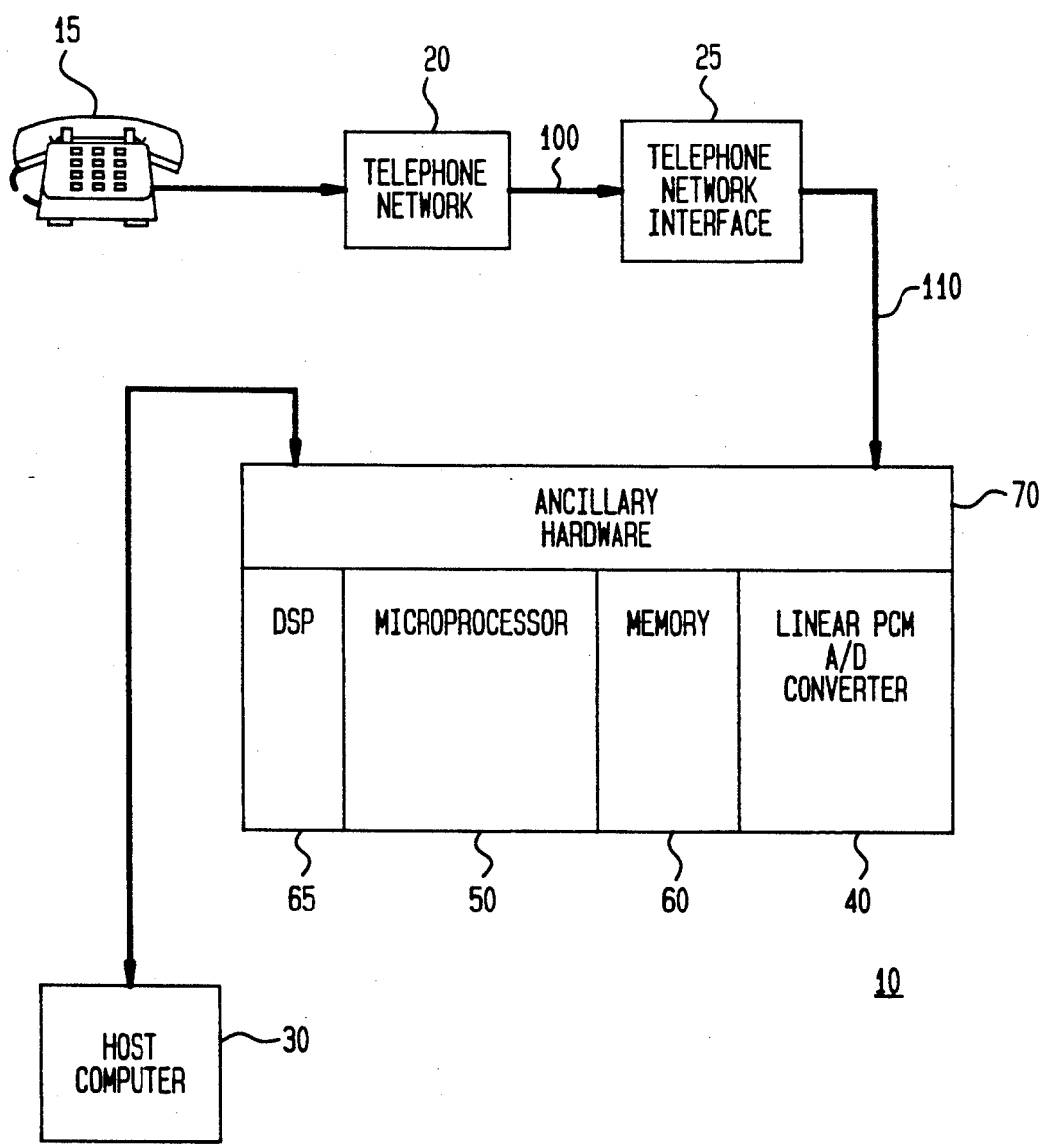
FIG. 1 shows a block diagram of a preferred embodiment of an embodiment of the inventive apparatus for detecting and identifying dial pulse digits in telephone signals.

FIG. 1 shows a block diagram of a preferred embodiment of inventive apparatus DM 10 for detecting and identifying dial pulse digits in a telephone signal. As shown in FIG. 1, dial pulse digits generated by telephone 15: (a) are transmitted as analog telephone signal 100 through telephone network 20 and (b) are transmitted as signal 110 through telephone network interface 25 to DM 10. Many apparatus are well known to those of ordinary skill in the art for use as telephone interface 25. For example, one such apparatus comprises a portion of a DIALOG/41 Digitized Voice and Telephony Computer Interface circuit which is available from Dialogic Corporation, 300 Littleton Road, Parsippany, N.J. 07054. In pertinent part, this circuit comprises well known means for interfacing with the telephone network to send and receive calls; means, such as transformers, to electrically isolate subsequent circuits; and filter circuits.

Signal 110 which is output from telephone network interface 25 is applied as input to DM 10 and, in particular, to ancillary hardware 70. Specifically, signal 110 is applied to a sample and hold circuit (not shown) in ancillary hardware 70, embodiments of which sample and hold circuit are well known to those of ordinary skill in the art.

The output from the sample and hold circuit contained in ancillary hardware 70 is applied to linear PCM analog-to-digital converter 40. There are many circuits which are well known to those of ordinary skill in the art that can be used to embody linear PCM analog-to-digital converter 40. The encoded signal output from analog-to-digital converter 40 is placed, sample by sample, into a tri-state buffer (not shown) for subsequent transmittal to a data bus (not shown). A tri-state buffer for performing this function is well known to those of ordinary skill in the art. For example, the tri-state buffer may be a TI 74LS244 tri-state buffer which is available from Texas Instruments of Dallas, Tex., or any other such equipment.

DM 10 further comprises microprocessor 50, memory 60, digital signal processor (DSP) 65, and, optionally, a portion of ancillary hardware 70 for use in interfacing with a host computer 30. DSP 65 may be any one of a number of digital signal processors which are well known to those of ordinary skill in the art such as, for example, a Motorola 56000 processor and microprocessor 50 may be any one of a number of microprocessors which are well known to those of ordinary skill in the art such as an INTEL 80286 microprocessor which is available from INTEL of Santa Clara, Calif., or any other such equipment. Memory 60 may be any one of a number of memory equipments which are well known to those of ordinary skill in the art such as an HITACHI 6264 RAM memory which is available from HITACHI America Ltd. of San Jose, Calif., or any other such equipment. The portion of ancillary hardware 70 which interfaces with host computer 30 may be readily fabricated by those of ordinary skill in the art by using circuits which are also well known to those of ordinary skill in the art. For example, the portion of ancillary hardware 70 which interfaces with host computer 30 may be comprised of TI 74LS245 data bus transceivers, TI 74LS244 address buffers, and TI PAL 16L8 control logic, all of which is available from Texas Instruments of Dallas, Tex., or any other such equipment. Finally, as shown in FIG. 1, DM 10 optionally interfaces with host computer 30, which may be any one of a number of computers which are well known to those of ordinary skill in the art such as, for example, an IBM PC/XT/AT, or any other such equipment.

Encoded digital samples output from linear PCM analog-to-digital encoder 40 are placed in the buffer (not shown) and are output, in turn, therefrom to the data bus (not shown). Then, the digital samples are received from the data bus, digital sample by digital sample, by DSP 65. DSP 65, in conjunction with a program and data stored in memory 60, analyzes a predetermined number of sequential digital samples, i.e., a frame, and, after such analysis, DSP 65 outputs analysis results data to the data bus for transmittance to microprocessor 50. Then, as will be described in detail below, microprocessor 50, in conjunction with a program and data stored in memory 60, analyzes the results data output from DSP 65 to detect and identify dial pulse digits in the input signal. Finally, after the detection and identification is completed, microprocessor 50 generates a detection and identification signal which is transmitted to host computer 30. As is well known to those of ordinary skill in the art, host computer 30 may be a part of an interactive system whose operation entails receiving information from a customer by means of dial pulse digits in response to commands and/or queries. As such, if host computer 30 is a part of such an interactive telecommuncations system (not shown), the telecommunications system will utilize the detection and identification signal provided by DM 10 to transmit further command and/or query signals to the customer or the telecommunications system will perform predetermined operations and transmit further information to the customer. Such interactive telecommunications systems are well known in the art and, for simplicity, their detailed operation need not be set forth here.

As stated above, DM 10 detects and identifies dial pulse digits in telephone signal 100. In addition, if input telephone signal 100 is not an analog signal, as is the case for the embodiment shown in FIG. 1, but is instead a digital signal, embodiments of the present invention, convert the digital values of the input signal into a linear PCM digital format if they are not already thusly encoded. For example, this means that if the input digital signal values originally had been encoded using a u-law or an A-law PCM encoding scheme, the digital values are converted into a linear PCM format. This conversion is performed in accordance with methods and apparatus which are well known to those of ordinary skill in the art such as, for example, by using a look-up table stored in memory 60. Nevertheless, in describing the inventive method and apparatus, for ease of understanding, the following refers to the linear PCM digital format samples which are output from analog-to-digital encoder 40 as digital samples.

Before discussing how DM 10 detects and identifies dial pulse digits in accordance with a specific preferred embodiment of the present invention, the following describes how DM 10 operates, without reference to the software programs, to detect and identify dial pulse digits.

In accordance with the present invention, the input signal is broken into short time duration segments for purposes of analysis, which short time duration segments are referred to as frames. In particular, a frame is comprised of a predetermined number of samples of an input analog signal or a predetermined number of values of an input digital signal.

In the preferred embodiment of the present invention shown in FIG. 1 for use in analyzing analog signal 100 which is transmitted over the public service telephone network ("PSTN") which has a 4000 Hz bandwidth, analog signal 100 is sampled, in accordance with the well-known Nyquist criterion, at least 8000 times/sec and the predetermined number of samples or values per frame is chosen to be 50.

Figure 4A:
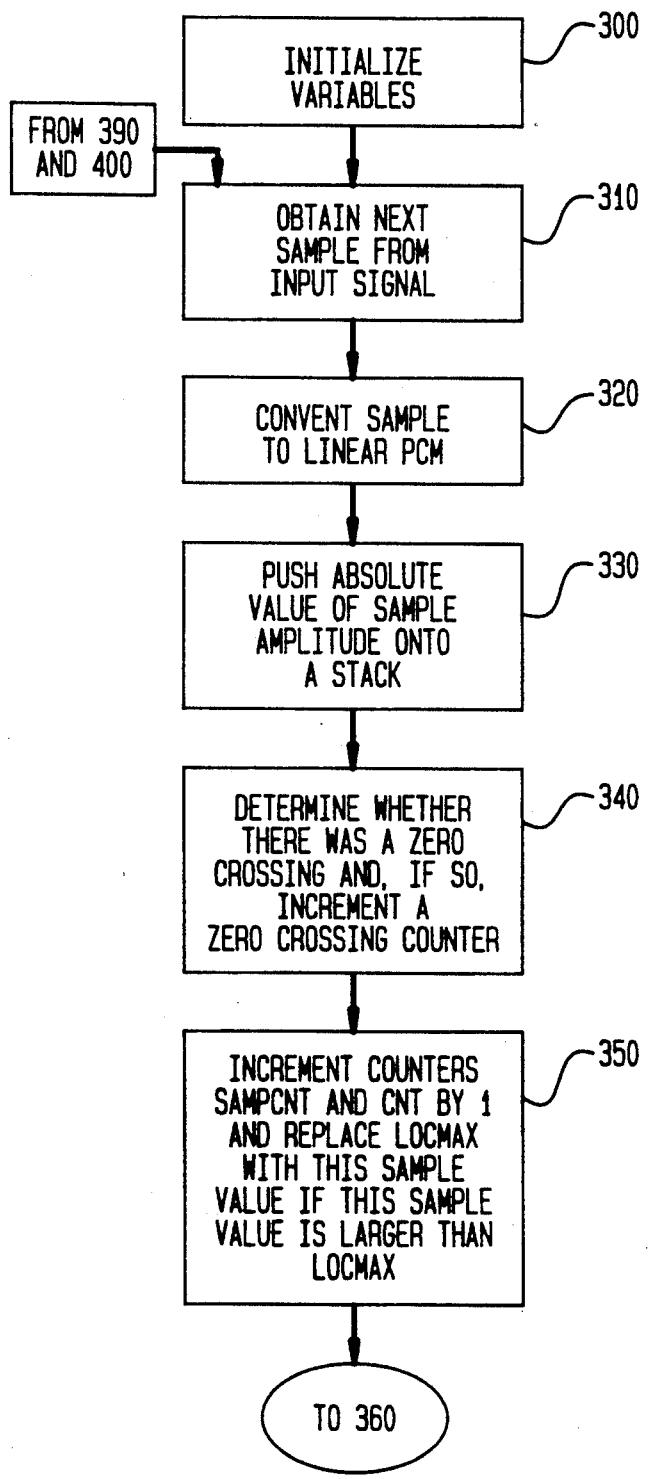
Figure 4A:
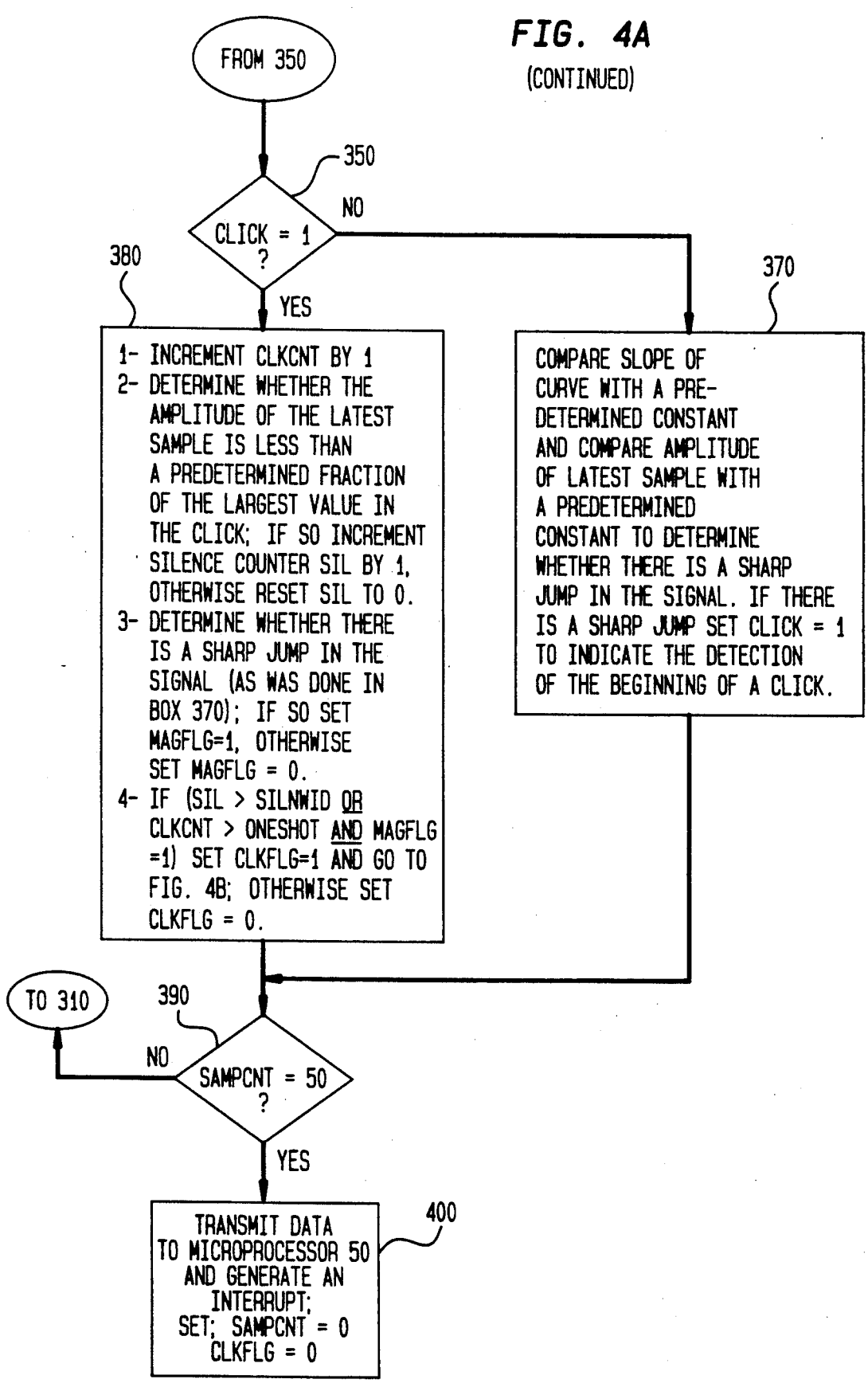

DSP 65 analyzes the digital samples in each frame under the direction of a software program which performs in accordance with the flow chart shown in FIGS. 4A–4C and, as a result, outputs analysis results data to microprocessor 50. Microprocessor 50 analyzes the analysis results data output from DSP 65 to detect and identify dial pulse digits under the direction of a software program which performs in accordance with the flow chart shown in FIGS. 5A-5G.

Figure 2:
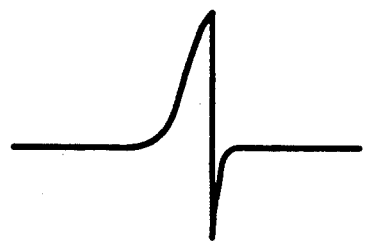
FIG. 2 shows, in pictorial form, the waveform of a typical click.

Dial pulse digits generated as an analog signal from a telephone are comprised of a train of audible clicks which are separated from each other by periods of silence. In a typical dial pulse digit, each click is approximately 1 msec to 33 msec in length and each period of silence is approximately 6 msec to 33 msec in length. FIG. 2 shows the waveform of a typical click in pictorial form. As those of ordinary skill in the art readily appreciate, dial pulse digits are provided in the form of clicks because a typical telephone system filters out DC.

Figure 3:
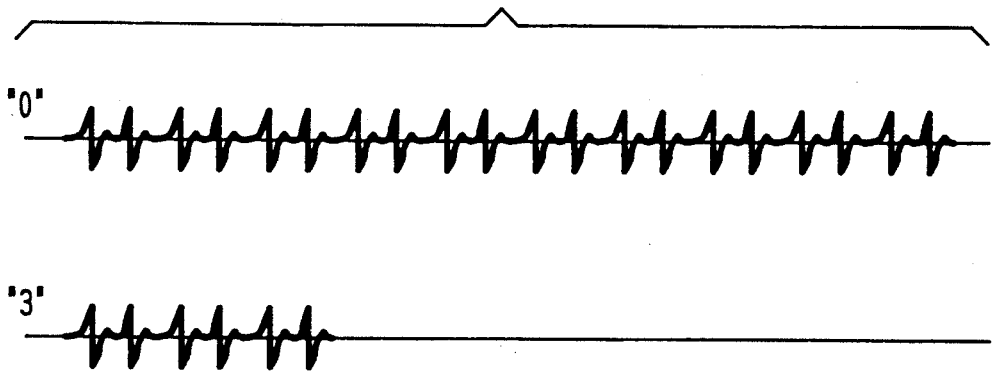
FIG. 3 shows, in pictorial form, a typical click structure for a dial pulse "0" digit and for a dial pulse "3" digit.

In particular, FIG. 3 shows, in pictorial form, an example of a typical click structure for a dial pulse "0" digit and for a dial pulse "3" digit. As one can readily appreciate from FIG. 3, the click structure for a dial pulse "3" digit is basically a subset of the click structure for a dial pulse "0" digit. Further, as is well known to those of ordinary skill in the art, the same is essentially true of all dial pulse digits generated by the same telephone over the same line. Indeed, embodiments of the present invention take advantage of this fact by initially requesting a telephone user to transmit a dial pulse "0" digit by dialing a "0." The manner in which a system may interact with a user to prompt the user to dial a "0" digit are well known to those of ordinary skill in the art. For example, a system may store a digital representation of such a message and transmit the message when the user is connected to the the system.

Next, in accordance with the present invention, DM 10 detects and analyzes the dial pulse "0" digit to determine a predetermined set of data to provide a template which is characteristic of the combination of: (a) the dial pulse "0" digit; (b) the particular telephone that generated this digit; and (c) the telephone over which the digit was transmitted to DM telephone 10—for example, it is well known that echo and loss may differ from telephone line to telephone line. Next, a subsequently transmitted dial pulse digit is detected and analyzed to determine a predetermined set of data which is characteristic thereof. Finally, in accordance with the present invention, DM 10 compares the predetermined set of data of the subsequently transmitted dial pulse digit with the template to identify the subsequently transmitted dial pulse digit.

In accordance with a preferred embodiment of the present invention, DSP 65 identifies individual clicks and determines predetermined data associated therewith. In particular, DSP 65 analyzes a frame comprised of 50 samples and reports the results of this analysis to microprocessor 50 by transmitting predetermined data thereto. In particular, whenever DSP 65 determines that a click has ended during a frame which is being analyzed, DSP 65 transmits the following data to microprocessor 50: (a) the sum of: (i) the length, in time, of the click which has ended in this frame and (ii) the length, in time, of the period of silence which has preceded this click; (b) the absolute value of the amplitude of the sample having the largest absolute amplitude in this click; (c) the number of zero crossings which have occurred in the time interval between the end of the click which preceded this click and the end of this click; and (d) the length, in time, of this click, i.e., exclusive of the length, in time, of the period of silence which preceded this click. In any other case, DSP 65 transmits data to microprocessor 50 which conveys the fact that no click has yet ended, i.e., an empty frame. In particular, DSP 65 transmits data to microprocessor 50 in the following form:

temp.wid the sum of the length, in time, of the click and the period of silence which preceded the click;

temp.lev the absolute value of the largest amplitude in this click;

temp.2x the number of zero crossings in the interval between the end of the prior click and the end of this click; and temp.clk the length, in time, of this click.

DSP 65 also sets a flag, i.e., clkflg, to report whether or not it has determined that a click has ended or not during this frame. In particular, DSP 65 sets clkflg=0 to indicate that a click has not ended during the interval comprised of the last 50 samples, whereas, DSP 65 sets clkflg=1 to indicate that a click has ended. Microprocessor 50 receives the data from DSP 65 and stores the data in a data structure in the form of a push-down stack.

DSP 65 utilizes the following set of criteria to determine whether a portion of an input signal comprises a click: (a) the amplitude of the signal must rise above a minimum threshold and (b) the signal must rise with a slope which is larger than a predetermined minimum slope. DSP 65 determines a "typical" amplitude for clicks which are generated by a particular telephone and transmitted over a particular telephone line by using a dial pulse "0" digit generated by the telephone and transmitted over the telephone line as a "training" tool. Specifically, in a preferred embodiment of the present invention, during "0" training, DSP 65 initially sets the minimum threshold equal to a relatively low, predetermined value. Then, as clicks are detected, DSP 65 resets the minimum threshold to be equal to a predetermined proportion of the absolute value of the largest amplitude sample contained in the detected clicks. Finally, after "0" training, the minimum threshold for use in detecting clicks in subsequently transmitted dial pulse digits is fixed for the particular telephone-telephone-line combination.

Microprocessor 50 receives data from DSP 65 comprised of click information and information relating to empty frames. Microprocessor 50 uses this information to determine when a dial pulse digit has ended by counting a predetermined number of consecutive empty frames which are stored in the stack. During "0" "training," microprocessor 50 analyzes the data in the data structure to determine whether they correspond to a set of clicks which have resulted from a dial pulse "0" digit. Microprocessor 50 does the following when it identifies a dial pulse "0" digit: (a) it stores the data structure as a template relating to a dial pulse "0" digit which was generated by a particular telephone and transmitted to DM 10 over a particular telephone-line and (b) it sends a signal to DSP 65 to inform it that "0" "training" is done.

Specifically, during "0" training, microprocessor 50: (a) "cleans up" individual clicks in the string of clicks that comprise a "0" in a manner which will be described in detail below and (b) examines the beginning and the end of the string of clicks in a manner which will be described in detail below to determine whether there is a large disconnect or reconnect time period relating thereto. If there is a large disconnect or reconnect time period, the data corresponding to a large disconnect and/or reconnect time period is discarded as being extraneous to the task of identifying dial pulse digits. It is well known to those of ordinary skill in the art that telephones which produce dial pulse digits disconnect the earpiece from the telephone line before generating dial pulses and reconnect the earpiece to the telephone line after the dial pulses have been generated. In addition, such a telephone typically generates an initial "disconnect" click having a long period of silence before the onset of clicks for a dial pulse digit or it generates a long period of silence after the end of clicks for a dial pulse digit which is followed by a "reconnect" click. As a result, microprocessor 50 cleans up the dial pulse "0" by discarding "disconnect" and/or "reconnect" clicks which are detected during "0" training. Then, microprocessor 50 stores the "cleaned" data structure as a "0" template.

Next, after "0" digit "training," microprocessor 50 examines the data structure for a subsequently generated dial pulse digit and searches for the end of the suspected dial pulse digit in the same manner in which it detected the end of the "0" digit during "0" training, i.e., by counting a predetermined number of consecutive empty frames which are stored in the stack. Then, microprocessor 50 analyzes the data structure of the suspected dial pulse digit in light of the data structure of the "0" template to determine whether the input signal corresponded to a dial pulse digit and, if so, its identity. In particular, for a dial pulse digit received after "0" training, microprocessor 50: (a) "cleans up" the individual clicks in the string of clicks that comprise the suspected dial pulse digit; (b) examines the beginning and the end of the string of clicks in a manner which will be described in detail below to determine whether there is a large disconnect or reconnect time period relating thereto and, if so, it discards such data corresponding to large disconnect and/or reconnect time periods; (c) examines the "0" template data structure and selects a subset thereof which corresponds to approximately the same number of clicks as are contained in the suspected dial pulse digit—as will be explained in detail below, in a preferred embodiment, this is done by choosing a subset of the "0" template that has approximately the same number of zero crossings that are present in the suspected dial pulse digit; and (d) compares the energy and other predetermined parameters of the data structure and the subset of the "0" template to identify the suspected dial pulse digit.

Later, at the beginning of each new telephone call to ) DM 10, microprocessor 50 signals DSP 65 to resume "0" training and to reset its minimum threshold to the initial, relatively low, predetermined value.

With the general description set forth above in mind, the following now describes the preferred embodiment of the present invention in connection with FIGS. 4A–4C and 5A–5G.

First, one must appreciate that when dial pulse digit detector DM 10 analyzes analog telephone signal 100, samples of the amplitude of signal 100 are obtained in time sequence. Second, each sample is converted to a linear PCM digital format by means, for example, of a comparison with data stored in lookup tables in memory 60 or in a companion ROM (not shown) and the linear sample data is stored in memory 60. Third, the linear sample data are accumulated and loaded, 50 samples at a time in the preferred embodiment, into DSP 65.

Operation of DSP 65

When DM 10 is activated for the first time, certain constants are given defined values which are not changed during the operation of DSP 65. For example, in the preferred embodiment of the present invention, the following constants are given defined values as follows: (a) botavg=8—botavg is a first predetermined number of samples to use in determining the slope of a signal, which slope is used to determine whether a click has begun; (b) topavg=2—topavg is a second predetermined number of samples to use in determining the slope of a signal, which slope is used to determine whether a click has begun, i.e., since topavg=2, use the current sample and the previous sample; (c) delay=1-0—delay is a predetermined number of samples prior to the current sample to consider in determining the slope, i.e., the program goes back "delay" samples and then averages the previous "botavg" samples in determining the slope; (d) silnwid=50—silnwid is the length of silence required to have occurred in determining that a click has ended; (e) echomax =160—echomax is a length which is used to prevent the program from mistaking a click as an echo and improperly suppressing it. Clicks sometimes have echoes and the program seeks to avoid counting an echo as a click. This is done by suppressing echoes. However, if a click is greater than "echomax" samples from the last click, the program determines that there is no echo and does not suppress the click; (f) oneshot=115—oneshot is a length which is used by the program to begin a new click. Thus, in some cases, the program will begin a new click, even though the program has not ended the present click, if the program has analyzed at least "oneshot samples" since the beginning of the present click; (g) minerg=2-50—minerg is the initial value of the minimum threshold that a sample has to exceed for the sample to be part of a click; (h) cslope=5—cslope is the minimum value of slope that must be exceeded to determine the start of a click. Slope is the ratio of the average of the "topavg" samples divided by the average of the "botavg" samples; (i) smtfac=4—in order to detect the end of a digit, the program needs to detect silence. The program determines that silence has occurred whenever the absolute value of the amplitude of a sample is less than thresh/smtfac; (j) clkmax=300—clkmax is the maximum length of clkcnt for a click, i.e., if a click is longer than clkmax, then it may be, for example, speech; (k) clkendt=4—clkendt is used to determine whether a sample corresponds to silence which occurs after a click has ended. The sample corresponds to silence after a click has ended if the absolute value of the amplitude of the sample <locmax/clkendt; and (1) tfac=3.2—digmax is the largest absolute value of amplitude of samples in the "0" digit obtained during "0" training. The program tests to make sure that click amplitudes are not too low and, as a result, "thresh" is set equal to digmax/tfac. Hence, the absolute value of the largest value of a sample in a click must be larger than "thresh."

FIGS. 4A–4C show a flow chart of a software program which directs the operation of DSP 65. Referring now to FIG. 4A, box 300 is the point in the program wherein certain constants are initialized. The following variables are initialized at box 300 of FIG. 4A as follows: (a) negflg=0—negflg is set=1 if a sample amplitude goes below zero; (b) maxsil=tenmax—maxsil is the maximum period of silence for a digit, it is initially set to tenmax, i.e., the value for a 10 pps dial pulse digit, however, it will be reset to twenmax, i.e., the value for a 20 pps dial pulse digit during "0" training, if the telephone is a 20 pps dial pulse telephone; (c) smlcnt=0—smlcnt is the length of silence below thresh/4; (d) clkcnt=0—clkcnt is the length of a click in number of samples until a sample falls below locmax/clkendt. If the signal is in the middle of silence and a sample exceeds locmax/clkendt, then the program resets the silence counter=0; (e) thresh=minerg—thresh is a minimum amplitude which a sample must exceed to be a part of a click, thresh is initially set equal to the defined constant minerg; (f) digmax=0—digmax is the maximum amplitude of a sample within a particular digit; (g) zflg=1—zflg is set=1 during "0" "training"; (h) locmax=0—locmax is the maximum amplitude of a sample for the current click; (i) zx=0—zx is a counter which equals the number of zero crossings in a digit; (j) click=0—click is set=1 if the signal is inside a click; (k) sil=0—sil is a counter which equals the length of silence at the end of a click; (l) sampcnt=0—sampcnt is a counter which equals the number of samples; (m) digr=1—digr is a digit calculated to be equal to 10 pwid/zwid, where pwid and zwid are variables which are defined below; (n) rerg=0—rerg is calculated to be equal to erg/zerg, where erg and zerg are variables which are defined below; and (o) rzx=0—rzx is calculated to be equal to zx/zzx, where zx and zzx are variables which are defined below. Then: (a) variable bufsiz is set equal to botavg+delay; (b) variable cnt is set equal to 3; and (c) vector buff[j] is set equal to 0 for all values of j<bufsiz. Finally, control is transferred to box 310.

At box 310, a sample, for example, a u-law data encoded sample, is obtained from input signal 100. Then, the program in DSP 65 transfers control to box 320.

At box 320, the sample is linearized, i.e., if the sample is a u-law digital sample, it is converted to a linear PCM sample. This transformation is performed in accordance with methods which are well known to those of ordinary skill in the art such by use of lookup table. Then, control is transferred to box 330.

At box 330, the program pushes the absolute value of the linear PCM value of the sample onto a stack, which stack is represented, for example, by the vector buff[j]. Then, control is transferred to box 340.

At box 340, the program determines whether or not there was a zero crossing in the signal between this sample and the previous sample. This is done as follows. If the sample value is negative, then the program sets negflg=1. However, if the sample value is positive and negflg=1 (indicating that the previous sample was negative) and the sample value is greater than thresh/smtfac, then the program increments zero crossing counter zx by 1 and sets negflg=0. Then, control is transferred to box 350.

At box 350, the program increments sample counter sampcnt by 1 and counter cnt by 1. If the absolute value of the sample value is larger than locmax (i.e., if the absolute value of the sample value is larger than the absolute value of the largest sample value encountered in the stack thusfar), then the program replaces locmax with the absolute value of the latest sample. Then, control is transferred to decision box 360.

At decision box 360, the program determines whether click=1. If click=1, the sample is in the middle of a click and control is transferred to box 380. If click is not=1, the program is searching for the start of a click and control is transferred to box 370.

At box 370, the program is searching for the start of a click. This search is performed by determining whether there is a sharp transition in magnitude of the samples, i.e., by determining whether the slope of the curve traced out by the samples changes rapidly. First, the program computes the average value of a bottom portion of the set of samples it has collected and stored in the stack, i.e., the older samples. This is done by: (a) going bufsiz samples back into the stack from the current sample which is on the top of the stack—for example, 18 samples—and (b) averaging the subsequent botavg samples in the stack—for example, 8 samples. Second, the program computes the average value of a top portion of the set of samples it has collected and stored in the stack, i.e., the more recent samples. This is done by averaging the last topavg samples in the stack —for example, 2 samples. Third, the program computes the ratio of the average of the top portion of the set of samples and the average of the bottom portion of the set of samples, i.e., the change in slope of the signal. Fourth, if the ratio is greater than a predetermined amount (for example, the predetermined constant cslope) and the absolute value of the latest sample is greater than another predetermined amount (for example, the predetermined constant thresh), then the program has determined that there is a sharp jump in the magnitude of the signal. Fifth, if there is such a sharp jump in the magnitude of the signal, the program sets click=1 to indicate that it has detected the beginning of a click. Then, control is transferred to decision box 390.

At box 380, the program is looking for the end of a click. First, it increments counter clkcnt by 1. Second, it determines whether the absolute value of the latest sample is less than a predetermined fraction (1/clkendt) of the maximum value encountered in the signal thusfar, i.e., the variable locmax. Thus, if the absolute value of the latest sample is less than locmax/clkendt, then the program considers this to have occurred as a consequence of silence. As a result, the program increments the silence counter variable sil (which counts periods of silence) by 1. On the other hand, if the absolute value of the latest sample is not less than locmax/clkendt, the program resets silence counter sil=0. Third, as was done in box 370, the program determines whether there is a sharp jump in the magnitude of the signal. If there is a sharp jump in the magnitude of the signal, the program sets flag magflg=1, otherwise the program sets flag magflg=0. Fourth, if silence counter sil is larger than a predetermined constant "silnwid," i.e., the program has detected a long period of silence, or counter clkcnt (the number of samples in the click until silence) is greater than a predetermined constant "oneshot" (a predetermined number of samples in a click) and magflg=1, then the program sets clkflg=1 to signify that a click has just ended and the program executes the part of the program shown in FIG. 4B to prepare data for transmittal to microprocessor 50. Otherwise, the program sets clkflg=0 to indicate that a click has not yet ended. Then, control is transferred to decision box 390.

At decision box 390, the program determines whether sampcnt=50. If so, control is transferred to box 310 to obtain the next sample, otherwise, control is transferred to box 400.

At box 400, the program generates an interrupt which causes microprocessor 50 to start processing. In addition, the following data are transmitted to microprocessor 50 for the just-received "frame" of 50 samples: clkflg; tmp.wid; tmp.lev; tmp.zx; and tmp.clk. Then, the program resets sampcnt=0 and clkflg=0. Finally, control is transferred to box 310.

Referring to FIG. 4B, the program has encountered the end of a click and it prepares data for transmittal to microprocessor 50 as follows: (a) $tmp.wid=cnt-sil$, i.e., tmp.wid equals the length of the click plus the preceding silence minus the trailing silence; (b) tmp.lev=locmax, i.e., tmp.lev equals the maximum absolute value of amplitude in the click; (c) tmp.zx=zx, i.e., tmp.zx equals the number of zero-crossings; and (d) $tmp.clk=clkcnt-sil$, i.e., tmp.clk equals the length of the large amplitude portion of the click. Second, the program initializes certain variables, i.e., it sets: cnt=sil; sil=0 (this is so we will not count silence until after the click is found); zx=0; and clkcnt=0. Third, if zflg=1 (the program is in "0" training) and variable digmax (the maximum absolute value of amplitude within the digit thusfar) is less than locmax (the largest absolute value of amplitude within this click), then: (a) the program sets digmax=locmax; (b) the program sets thresh=digmax/tfac; and (c) if thresh<minerg, the program sets thresh=minerg. Fourth, the program sets locmax equal to the absolute value of the amplitude of the latest sample. Fifth, determine whether the click is too long to be associated with a digit as follows. If the length of the large amplitude portion of the click, i.e., tmp.clk, is greater than predetermined constant clkmax, then execute the part of the program shown in FIG. 4C. Sixth, if flag magflg=0 to indicate that the signal is in silence, the program sets flag click=0 to indicate that the program is looking for a new click. Then, control is returned to the portion of the program from which control was originally transferred.

Referring to FIG. 4C, if flag zflg=1 to indicate that the program is doing "0" training, the program sets: thresh=minerg; locmax=0; and digmax=0. Then, the program generates an interrupt to start microprocessor 50 at the portion of the program shown in 5G to cause microprocessor 50 to start all over.

Operation of Microprocessor 50

When DM 10 is activated for the first time, certain constants are given defined values which are not changed during the operation of microprocessor 50. For example, in the preferred embodiment of the present invention, the following constants are given defined values as follows: (a) break20=300—break20 is the maximum length of a break for a 20 pps dial pulse digit; (b) break10=600—break10 is the maximum length of a break for a 10 pps dial pulse digit; (c) make20=1-50—make20 is the maximum length of a make for a 20 pps dial pulse digit; (d) make10=300—make10 is the maximum length of a make for a 10 pps dial pulse digit; (e) zclicks=9—zclicks is the minimum number of (clicks−1) for a valid "0" digit; (f) fusemax=140—A click must be <clkmax. However, if a click is >fusemax, the program assumes that two clicks or a click and an echo have run together, i.e., fused; (g) twenmax=5-12—twenmax is the maximum period of silence for a 20 pps dial pulse digit; (h) tenmax=768—tenmax is the maximum period of silence for a 10 pps dial pulse digit; (i) len10=6000—len10 is the minimum length of a 10 pps dial pulse digit; and (j) digrcut=0.38—digrcut is an amount used to provide a floor in calculating the identity of a digit in accordance with a portion of the program shown in FIG. 5D.

Figure 5A:
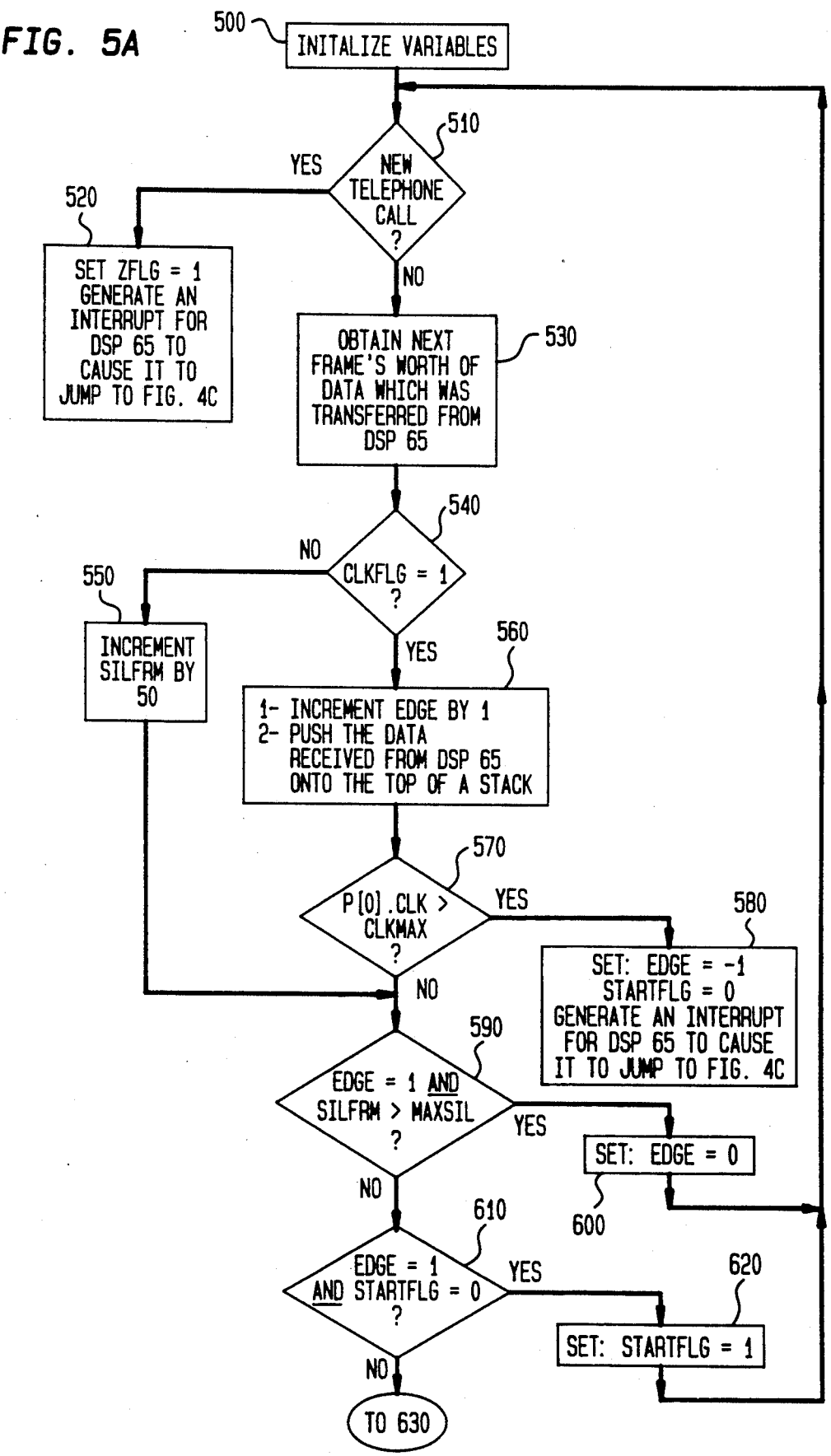
FIGS. 5A–5G show a flow chart of a program which directs the operation of a microprocessor which comprises the preferred embodiment of the inventive apparatus shown in FIG. 1.
Figure 5A:
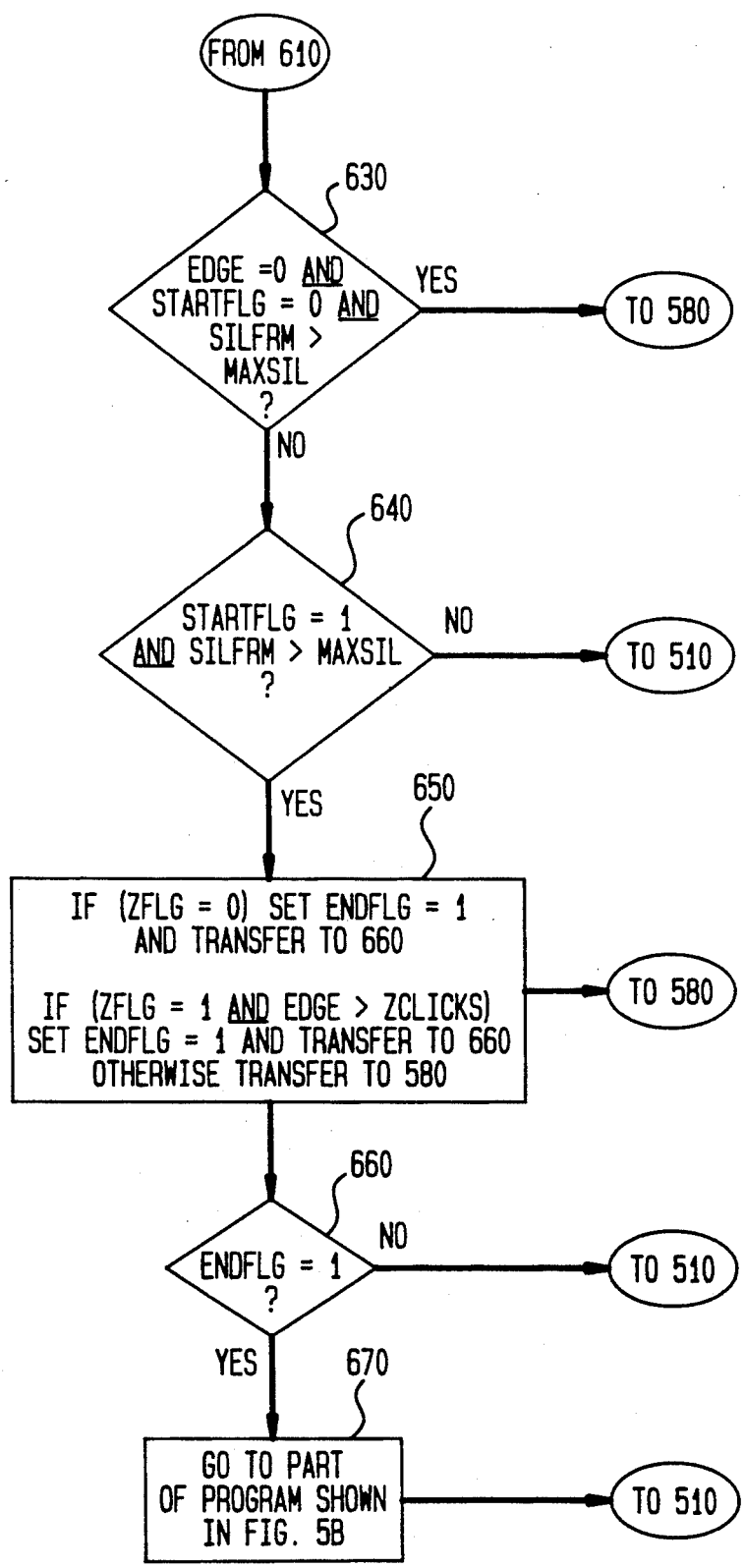

FIGS. 5A-5G show a flow chart of a software program which directs the operation of microprocessor 50. Referring now to FIG. 5A, box 500 is the point in the program wherein certain constants are initialized. The following variables are initialized at box 500 of FIG. 5A as follows: (a) modflg=0—modflg is a flag for use in the portion of the program described in connection with FIG. 5D; (b) pwid=0—pwid is the length of dial pulse digit in samples; (c) zwid=1—zwid is the length of the "0" template in samples; (d) zdigwid=0—zdigwid is the length of the "0" template having numclk clicks. This variable determines a portion of the "0" template which is used to identify an unknown dial pulse digit. For example, if an unknown digit has "numclk" clicks, the program examines the "0" template and determines the number of samples, i.e., zdigwid, to provide this number of clicks; (e) edge=−1—edge is a counter of clicks in the digit; (f) zege=0—zege is the final value of edge for the "0" template; (g) numclk=0—numclk is the number of clicks in a digit; (h) numclkz=0—numclkz is the number of clicks in the "0" template through "pwid" samples; (i) digclk=0—digclk=numclk−numclkz; (j) lastclk=0—lastclk is the position in the stack, i.e., p[ ], of the last click in a digit; (k) zlastclk=0—zlastclk is the position in the stack, i.e., p[ ], of the last click in the zero template; (l) flg10=1—flg10 is a flag indicating that we are dealing with 10 pps dial pulse digits; (m) digit=0—digit is the value of the digit, from 1-10; if digit=0, there is no digit; (n) endflg=0—endflg is a flag to indicate the end of a digit was reached; (o) startflg=0—startflg is a flag to indicate we suspect a digit; (p) zxsum=0—zxsum is the sum of the zero crossings in a digit; (q) zzxsum=0—zzxsum is the sum of the zero crossings in pwid samples of the "0" template; (r) make=make10—make is the make maxlength for either 10 pps or 20 pps dial pulse digits; (s) brak=break10—brak is the break maxlength for either 10 pps or 20 pps dial pulse digits; (t) lclnflg=0—lclnflg is a flag to indicate that we "cleaned" the last click from the "0" template; (u) fclnflg=0—fclnflg is a flag to indicate that we "cleaned" the first click from the "0" template; (v) zerg=0—zerg is the total energy in the "0" template through pwid samples; and (w) erg=0—erg is a measure of the total energy in the digit through pwid samples. Then, initialize several vectors which are utilized to identify a digit in accordance with a portion of the program shown in FIG. 5F by setting the first 10 positions as follows, i.e., for j=0-9: (a) digrmn(j)=float(j)+digrcut; (b) digrmx(j)=float(j)+(1+digrcut); (c) rergmn(j) =0.4; (d) rergmx(j)=1.6; (e) rzxmn(j)=0.2; (f) rzxmx(j)=5.0; (g) difclkmn(j)=−7.0; and (h) difclkmx(j)=7.0. Finally, set p[0].wid=0. Then, control is transferred to decision box 510.

At decision box 510, microprocessor 50 determines whether a new telephone call was just initiated. For example, this information may be transmitted to microprocessor 50 from the host computer in such a manner that a flag in memory 60 is set. If so, control is transferred to box 520, otherwise, control is transferred to box 530.

At box 520, a new telephone call was initiated. The program sets zflg=1 and generates an interrupt for DSP 65. This interrupt is such as to cause DSP 65 to do "0" "training" and, in response to this interrupt, the program in DSP 65 jumps to the part thereof shown in FIG. 4C.

At box 530, the program for microprocessor 50 waits until DSP 65 receives and analyzes the next frame of samples and then transfers that data to microprocessor 50. Then, control is transferred to decision box 540.

At box 540, the program determines whether or not clkflg=1. As was described above, clkflg is part of the data that DSP 65 transfers to microprocessor 50. If clkflg=1, thereby indicating that a click has ended, control is transferred to box 560, otherwise, control is transferred to box 550.

At box 550, the program increments counter silfrm by 50. Counter silfrm keeps track of the number of samples input and, for this embodiment, there are 50 samples per frame. Then, control is transferred to decision box 590.

At box 560, the program increments counter edge by 1, edge counts clicks. Next, the program pushes the data transferred from DSP 65 onto a stack as follows: (a) p[0].wid=tmp.wid; (b) p[0].lev=tmp.lev; (c) p[0].zx=tmp.zx; and (d) p[0].clk=tmp.clk. Then, control is transferred to decision box 570.

At decision box 570, the program determines whether p[0].clk, i.e., the length of the click, exceeds a predetermined constant, clkmax, i.e., clkmax represents the maximum expected click length. If so, control is transferred to box 580, otherwise, control is transferred to decision box 590.

At box 580, the program resets edge=−1 and the program sets flag startflg=0. When these flags are thusly set, microprocessor 50 ignores previous clicks. Then, an interrupt is sent to DSP 65 which causes it to jump to the part of the program which relates to FIG. 4C in order to cause DSP 65 to start over again.

At decision box 590, the program determines whether edge=1 and variable silfrm is greater than a predetermined constant maxsil (If silfrm is >maxsil, the program has encountered a period of silence which is too long a period of silence for a bona fide dial pulse digit). If so, control is transferred to box 600, otherwise, control is transferred to decision box 610.

At box 600, the program resets edge=0. Then, control is transferred to decision box 510.

At decision box 610, the program determines whether edge=1 and startflg=0 (If startflg=1, the program suspects a dial pulse digit). If so, control is transferred to box 620, otherwise, control is transferred to decision box 630.

At box 620, the program sets startflg=1. Then, control is transferred to decision box 510.

At decision box 630, the program determines whether edge=0 and startflg=0 and silfrm>maxsil (If edge=0, then a click has not started; if startflg=0, then a digit has not started; and if silfrm>maxsil, then there is more than enough silence to end a digit). If so, control is transferred to box 580, otherwise, control is transferred to decision box 640.

At decision box 640, the program determines whether startflg=1 and silfrm>maxsil (If startflg=1, then a digit has started and if silfrm>maxsil, there is more than enough silence to end a digit and the program does not need to search for further clicks). If so, control is transferred to decision box 650, otherwise, control is transferred to decision box 510.

At decision box 650, the program suspects it has a dial pulse digit and it is searching for the end thereof. If there is an invalid end to the digit, the programs starts over again by transferring control to box 580, otherwise, the program sets flg endflg=1. First, the program determines whether zflg=0 to see whether it is in the middle of "0" training. If zflg=0, then it is not in the middle of "0" training and the program sets flag endflg=1. Then, control is transferred to decision box 660. Second, if zflg=1, then it is in the middle of "0" training and so, the program determines whether counter edge is greater than a predetermined constant, i.e., zclicks. This is done to determine whether the program has accepted a sufficient number of clicks for a "0" digit. If so, the program sets endflg =1 and control is transferred to decision box 660, otherwise, control is transferred to box 580.

At decision box 660, the program determines whether flag endflg=1. This is done to determine whether the program has reached the end of a digit. If so, control is transferred to box 670, otherwise, control is transferred to decision box 510.

Figure 5B:
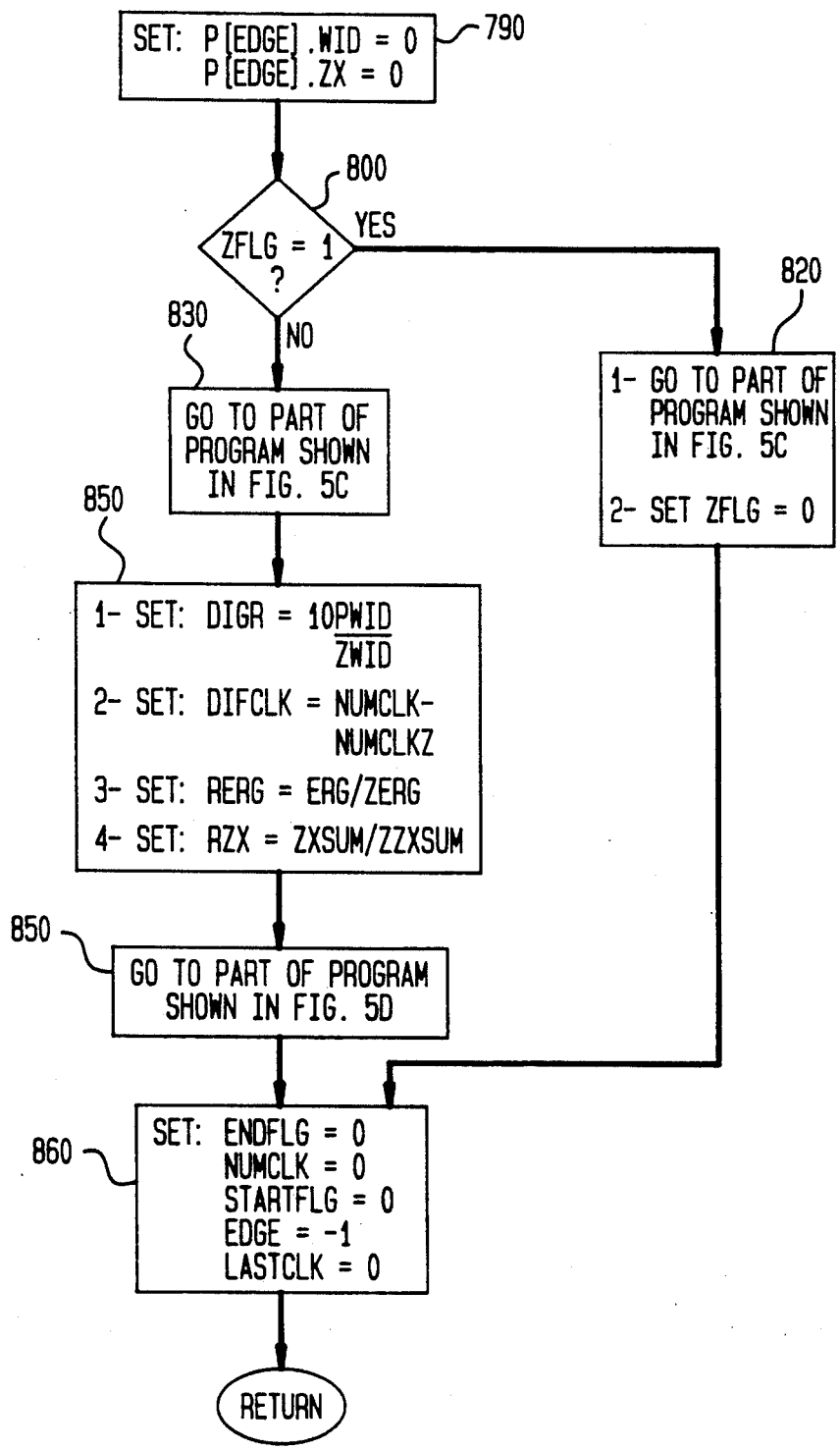

At decision box 670, the program performs an analysis of the suspected digit by executing the part of the program shown in FIG. 5B. Then, control is transferred to decision box 510.

Referring to FIG. 5B, at box 790, the program ignores silence before the first click and zero crossings before the first click. As a result, the program sets p[edge].wid=0 and p[edge].zx=0. Then, control is transferred to decision box 800 of FIG. 5B.

At decision box 800 of FIG. 5B, the program determines whether zflg=1. If zflg=1, the program is in "0" training and control is transferred to box 820 of FIG. 5B, otherwise, control is transferred to box 830 of FIG. 5B.

At box 820 of FIG. 5B, the program cleans up the digit for connects and computes other measures. This is done by executing the part of the program shown in FIG. 5C. Then, the program resets flag zflg=0. Finally, control is transferred to box 860 of FIG. 5B.

At box 830 of FIG. 5B, the program cleans up the digit for connects and computes other measures. This is done by executing the part of the program shown in FIG. 5C. Then, control is transferred to box 840 of FIG. 5B.

At box 840 of FIG. 5B, first, the program sets variable digr=10(pwid/zwid), i.e., the program sets digr equal to ten (10) times the ratio of the number of clicks in the suspected digit to the number of clicks in the "0" template. Second, the program sets variable *difclk* =*numclk*−*numclkz*, i.e., the program sets difclk equal to the difference between the number of clicks in the suspected digit and the number of clicks in the "0" template. Third, the program sets variable rerg=erg-/zerg, i.e., the program sets rerg equal to the ratio of energy in the suspected digit to the energy in the "0" template. Fourth, if zzxsum is not=0, the program sets rzx=zxsum/zzxsum, i.e., rzx equals the ratio of the number of zero crossings in the suspected digit to the number of zero crossings in the "0" template, otherwise, the program sets rzx=0 to avoid division by 0. Then, control is transferred to box 850 of FIG. 5B.

Figure 5C:
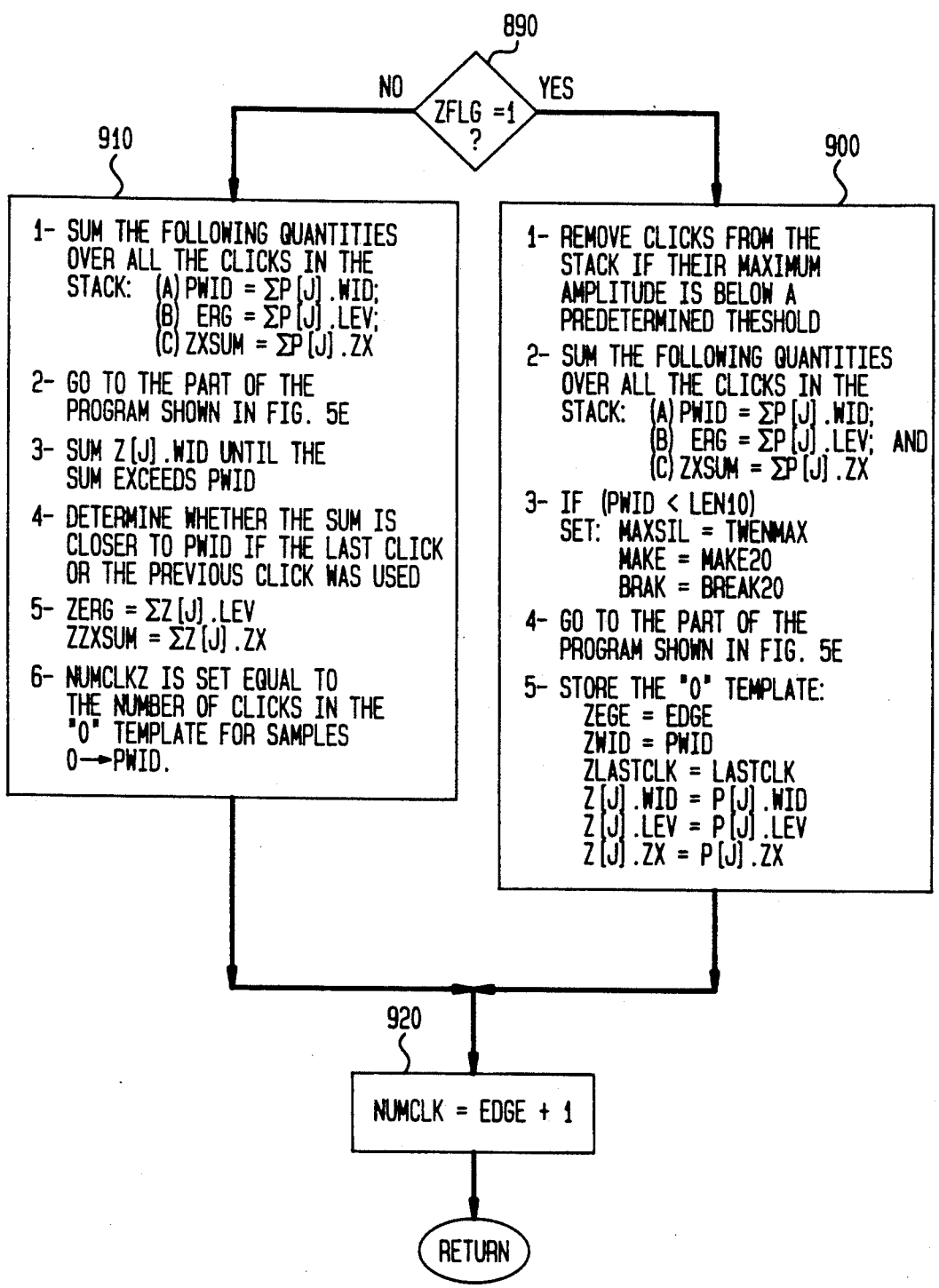
Figure 5D:
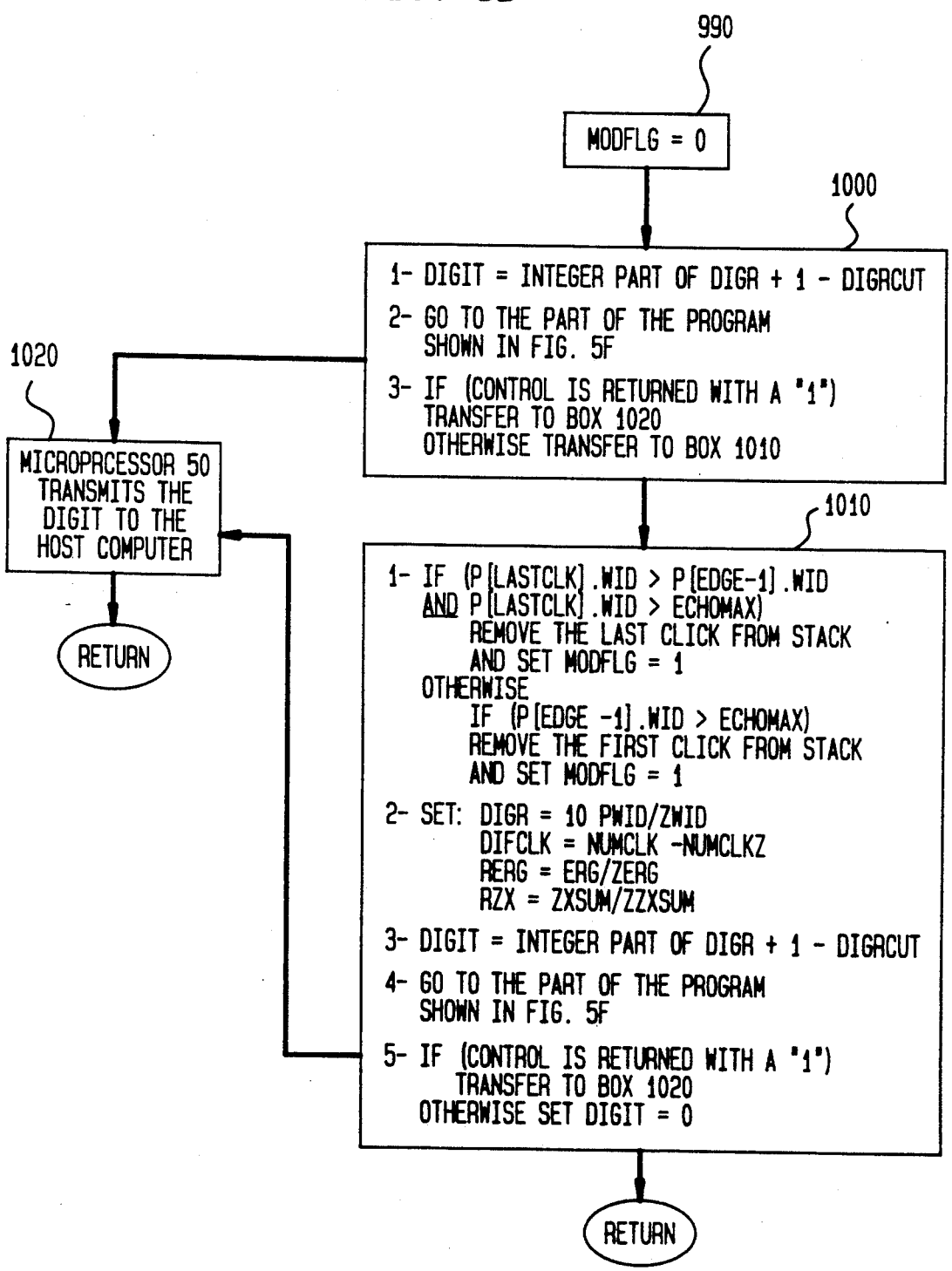

At box 850 of FIG. 5B, microprocessor 50 executes the part of the program shown in FIG. 5D. Then, control is transferred to box 860 of FIG. 5B.

At box 860 of FIG. 5B, the program resets the following flags: endflg=0; numclk=0; startflg=0; edge=−1; and lastclk=0. Then, control is returned to the portion of the program from which control was originally transferred.

Referring to FIG. 5C, at decision box 890, the program determines whether flag zflg=1 to discover whether the program is in "0" training. If so, control is transferred to 900, otherwise, control is transferred to 910 of FIG. 5C.

At box 900 of FIG. 5C, the program is in "0" training. First, the program cleans out clicks that have a maximum amplitude below a predetermined threshold, i.e., the program removes click j from the stack if p[j].lev<- thresh. Second, the program sums the following quantities over all of the clicks in the stack, i.e., for the "0" template: (a) click widths (pwid=sum over all the clicks in the stack of p[j].wid); (b) click levels (erg=sum over all the clicks in the stack of p[j].lev); and (c) zero crossings (zxsum=sum over all the clicks in the stack of p[j].zx). Third, if pwid (the total length of the clicks for the digit) is less than a predetermined constant, for example, len10, where len10 corresponds to the minimum length of a 10 pps dial pulse digit, then the program has determined that the signal corresponds to a 20 pps dial pulse digit. Thus, if the signal corresponds to a 20 pps dial pulse digit, the program sets the following variables: maxsil=twenmax; make=make20; and brak=break20. Fourth, the program cleans up connects by executing the part of the program shown in FIG. 5E. Fifth, the program stores the cleaned "0" dial pulse digit as a "0" template in a data structure z[ ], as follows: (a) zege=edge (zege equals the number of (clicks −1) in the "0" template); (b) zwid =pwid (zwid equals the length of the "0" template); (c) zlastclk =lastclk (zlastclk equals the last click for the "0" template); and (d) z[j].wid=p[j].wid, z[j].lev=p[j].lev, and z[j].zx =p[j].zx. Then, control is transferred to box 920 of FIG. 5C.

At box 910, the program is not in "0" training. First, the program sums the following quantities over all of the clicks in the stack, i.e., for the suspected digit: (a) click widths (pwid=sum over all the clicks in the stack of p[j].wid); (b) click levels (erg=sum over all the clicks in the stack of p[j].lev); and (c) zero crossings (zxsum=sum over all the clicks in the stack of p[j].zx). Second, the program cleans up connects by executing the part of the program shown in FIG. 5E. Third, the program computes the sum of the energy and the number of zero crossings in the "0" template from 0 to pwid (pwid equals the length, in samples, of the suspected digit). This is done by first going through the clicks in the "0" template and summing the lengths, i.e., z[j].wid, until the sum of z[j].wid exceeds pwid. Fourth, the program determines whether the sum is closer to pwid if the program uses the last click in the sum at which pwid was exceeded or the previous one. Fifth, the program sums the energy of the clicks used in the "0" template, i.e., zerg is set equal to the sum of z[j].lev, and the program sums the number of zero crossings of the clicks used in the "0" template, i.e., zzxsum is set equal to the sum of z[j].zx. Sixth, the program sets numclkz equal to the number of clicks in the "0" template for samples 0 to pwid. Then, control is transferred to box 920 of FIG. 5C.

With reference to box 920 of FIG. 5C, the program sets numclk=edge+1 (number of clicks in this digit). Then, control is returned to the portion of the program from which control was originally transferred.

With reference to FIG. 5D, first, at box 990, the program sets flag modflg=0. Then, control is transferred to box 1000.

At box 1000, the program determines the identity of the dial pulse digit. First, the program determines the identity of the digit as the integer part of digr+1−digrcut. As one can readily appreciate, the non-integer portion of digr+1 can extend from just over 0, for example, 0.001, to just under 1.0, for example, 0.999. As a result, for example, if digr+1 is equal to 5.1 or 5.87, the integer part will be equal to 5. In practice, we have determined that if an offset, i.e., digrcut, is subtracted from digr+1, the inventive method can, more reliably, identify dial pulse digits. The value of digrcut may be determined by experimentation and the value which is used in a preferred embodiment of the present invention, i.e., digrcut=0.38, is set forth above in regard to the initialization.

Figure 5E:
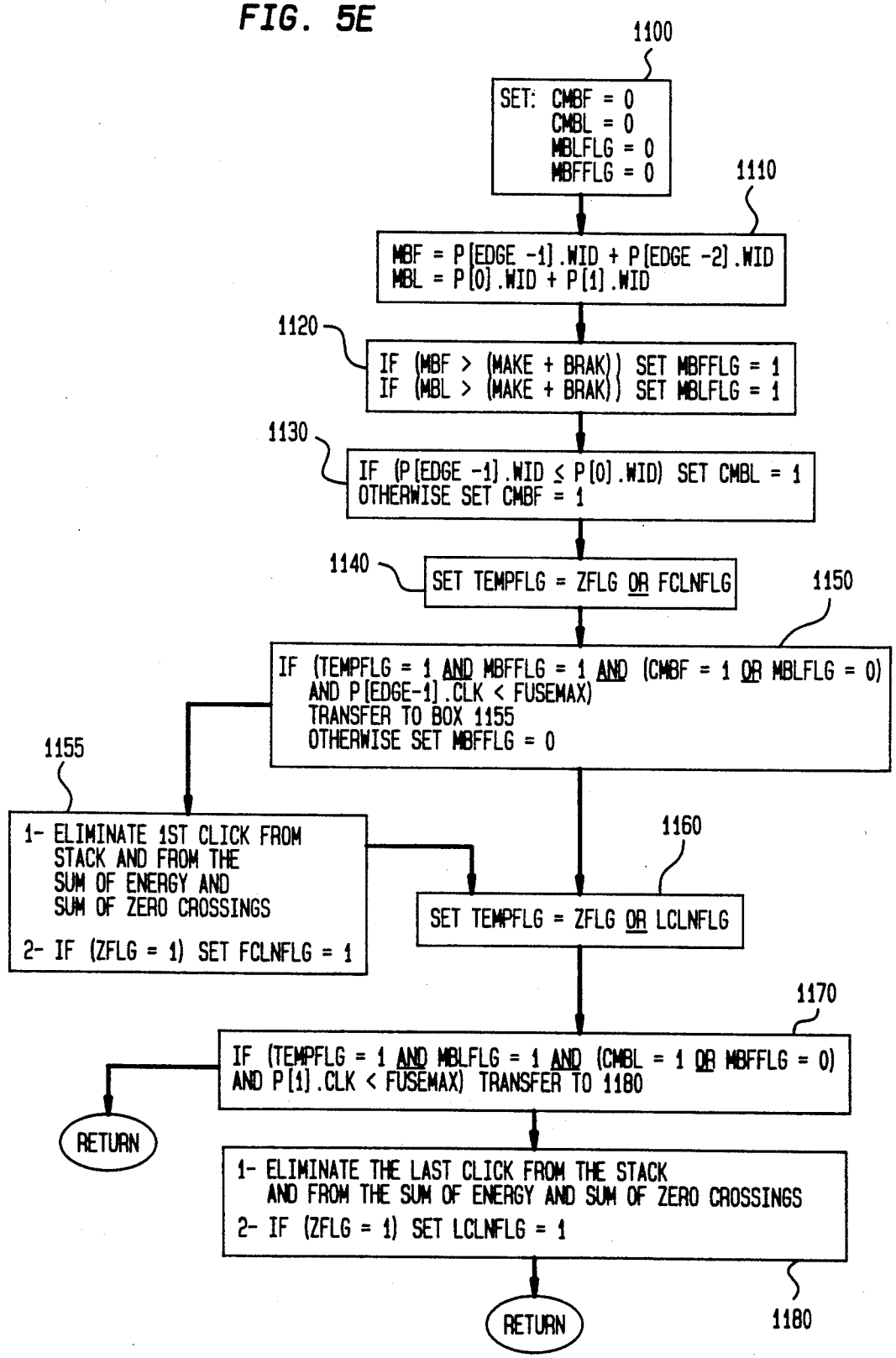
Figures 5F, 5G:
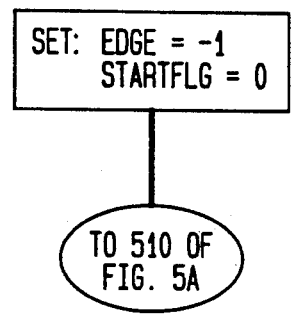

Second, the program executes the part of the program shown in FIG. 5F. Third, if control is returned to the program shown in FIG. 5D with a "1," control is transferred to box 1020, otherwise, control is transferred to box 1010.

At box 1010, the program gives the digit one more chance at being a valid digit by removing the first or the last click from the stack for the digit. This strategy is dictated by the assumption that, perhaps, a disconnect click or a reconnect click was not properly removed from the stack. Therefore, at box 1010, the program removes the larger of the first and last clicks as follows. At box 1010 of FIG. 5D, first, the program determines whether p[lastclk].wid>p[edge−1].wid and p[lastclk].wid>echomax, and, if so, the program removes the last click from the stack for the digit and sets modflg=1. Otherwise, the program determines whether p[edge−1].wid>echomax, and, if so, the program removes the first click from the stack for the digit and sets modflg=1. Second, the program recomputes digr, difclk, rerg, and rzx. Third, the program determines the identity of the digit as the integer part of digr +1−digrcut. Fourth, the program executes the part of the program shown in FIG. 5F. Fifth, if control is returned to the program shown in FIG. 5D with a "1," control is transferred to box 1020. Otherwise, the program sets digit=0. Then, control is returned to the portion of the program from which control was originally transferred.

At box 1020, the program causes microprocessor 50 to transmit the digit to the host computer. Then, control is returned to the portion of the program from which control was originally transferred.

Referring to FIG. 5E, the program cleans up connects and disconnects. In essence, the program does this by determining whether the sum of the widths of the first two clicks in the stack is greater than a predetermined amount. If it is, the first click in the stack probably represents the effect of a connect and, as a result, the program removes it from the click structure. Likewise, the program determines whether the sum of the widths of the last two clicks in the stack is greater than a predetermined amount. If it is, the last click in the stack probably represents the effect of a disconnect and, as a result, the program removes it from the click structure.

At box 1100 of FIG. 5E, the program initializes the following variables: cmbf=0; cmbl=0; mblflg=0; and mbfflg=0. Then, control is transferred to box 1110.

At box 1110, the program sets mbf=p[edge−1].wid+p[edge−2].wid (mbf is the make and break connection at the beginning of the digit and it is set equal to the sum of the samples in the first two clicks, i.e., the two clicks at the bottom of the stack) and the program sets mbl=p[0].wid+p[1].wid (mbl is the make and break connection at the end of the digit and it is set equal to the sum of the samples in the last two clicks, i.e., the two clicks at the top of the stack). Then, control is transferred to box 1120.

At box 1120, if mbf is greater than the sum of two variables make and brak, the program sets flag mbfflg=1. Further, if mbl is greater than the sum of the two variables make and brak, the program sets flag mblflg=1. Then, control is transferred to box 1130.

At box 1130, if the length of the first click in the stack, i.e., p[edge−1].wid, is less than or equal to the length of the last click in the stack, i.e., p[0].wid, then the program sets cmbl=1, otherwise, the program sets cmbf=1. Then, control is transferred to box 1140.

At box 1140, the program sets flag tempflg=zflg or fclnflg (thus, tempflg=1 if zflg=1, i.e., "0" training, or if we "cleaned" the first click during "0" training). Then, control is transferred to box 1150.

At box 1150, if tempflg=1 and mbfflg=1 and (cmbf=1 or mblflg=0) and p[edge−1].clk <fusemax (i.e., two clicks did not fuse together), then control is transferred to box 1155. Otherwise, the program sets mbfflg=0. Then, control is transferred to 1160.

At box 1155, first, the program eliminates the first click from the stack and subtracts the first click from the sum of energy and from the sum of zero crossings. Second, if zflg=1 ("0" training), the program sets fclnflg=1 so that the program will "clean" the first click on subsequent digits when the program "cleans" the first click during "0" training. Then, control is transferred to box 1160.

At box 1160, the program sets tempflg=zflg or lclnflg (thus, tempflg=1 if zflg=1, i.e., "0" training, or if the program "cleaned" the last click during "0" training). Then, control is transferred to box 1170.

At box 1170, if tempflg=1 and mblflg=1 and (cmbl=1 or mbfflg=0) and p[1].clk<fusemax (i.e., two clicks did not fuse together), then: control is transferred to box 1180. Otherwise, control is returned to the portion of the program from which control was originally transferred.

At box 1180, first, the program eliminates the last click from the stack and the program subtracts the last click from the sum of energy and from the sum of zero crossings. Second, if zflg=1 ("0" training), the program sets lclnflg=1 so that the program will "clean" the last click on subsequent digits when the program "cleaned" the last click during "0" training. Then, control is returned to the portion of the program from which control was originally transferred.

With reference to FIG. 5F, the program verifies the identity of a particular digit. At this point the program has determined the values of parameters which are relevant to a digit, such as, for example: digr, rerg, rzx, and difclk. Further, in practice, the values of these parameters vary over ranges of values. Still further, we have determined that the range of values may differ for different digits. Thus, at this point, the program tests the parameters to see if they fall within predetermined boundaries for a particular digit identification. The values of the boundaries may be determined by experimentation and the values which are used in the preferred embodiment of the present invention are set forth above in regard to the initialization. If digr>digrmn[digit−1] and digr<digrmx[digit−1] and rerg>rergmn[digit−1] and rerg<rergmx[digit−1] and rzx>rzxmn[digit−1] and rzx<rzxmx[digit−1] and difclk>difclkmn[digit−1] and difclk<difclkmx[digit−1], control is returned with a "1," otherwise, control is returned with a "0." Then, control is returned to the portion of the program from which control was originally transferred.

Referring to FIG. 5G, the program resets edge=−1 and the program sets flag startflg=0. Then, control is transferred to decision box 510 of FIG. 5A.

As should be clear to those of ordinary skill in the art, the embodiment of the present invention which was described in detail above is a dial pulse digit detector which analyzes an input signal and, in response thereto, generates an identifier signal for use by another apparatus such as host computer 30. For example, the another apparatus can be an interactive system which can transmit voice signals to a human in the form of information and queries and can receive responses from the human in the form of various combinations of dial pulse digits. In such a system, embodiments of the present invention advantageously provide detection and identification of the dial pulse digits which are transmitted to the interactive system.

Those skilled in the art recognize that further embodiments of the present invention may be made without departing from its teachings. For example, embodiments of the present invention operate with 10 pps or with 20 pps dial pulse digits. Still further, embodiments of the present invention may use another dial pulse digit for training other than a "0" or may use combinations of digits for training. For example, one may use a "9" for training purposes and so forth. Yet still further, embodiments of the present invention may involve the determination of a multiplicity of templates which are stored for later use in connection with the identification of latter received dial pulse digits. Such templates may refer to predetermined dial pulse digits and/or predetermined telephones and/or predetermined telephone connections.

What is claimed is:

1. A method for detecting and identifying dial pulse digits in a telephone signal comprises the steps of:
   detecting a series of pulses referred to as clicks which comprise one or more predetermined dial pulse digits;
   analyzing the clicks of the one or more predetermined dial pulse digits to determine a predetermined set of data to provide a template, the data comprising a measure of energy, length, and number of zero crossings for each of the clicks;
   detecting a series of clicks which comprise a further dial pulse digit;
   analyzing the clicks of the further dial pulse digit to determine a further predetermined set of data, the data comprising a measure of energy, length, and number of zero crossings for each of the clicks; and
   comparing the further predetermined set of data with the data comprising the template to identify the further dial pulse digit.

2. A method for detecting dial pulse digits in a telephone signal comprises the steps of:
   detecting a series of pulses referred to as clicks which comprise a dial pulse "0" digit;
   analyzing the clicks of the dial pulse "0" digit to determine a predetermined set of data to provide a template, the data comprising a measure of energy, length, and number of zero crossings for each of the clicks;
   detecting a series of clicks which comprise a further dial pulse digit;
   analyzing the clicks of the further dial pulse digit to determine a further predetermined set of data, the data comprising a measure of energy, length, and number of zero crossings for each of the clicks; and
   comparing the further predetermined set of data with the data comprising the template to identify the further dial pulse digit.

3. The method of claim 2 wherein the step of comparing comprises the steps of:

determining a sum of the length, a sum of the measure of energy, and a sum of the number of zero crossings for the clicks of the further dial pulse digit;

selecting a portion of the template by determining a sum of the length of clicks until finding data for clicks having a sum which is close, to within a predetermined degree, to the sum of the length for the clicks of the further dial pulse digit; and identifying the further dial pulse digit utilizing the number of clicks and the sums for the further dial pulse digit and data from the portion.

4. The method of claim 3 wherein the step of identifying the further dial pulse digit comprises determining whether a ratio of the sum of the measure of energy and a ratio of the sum of the number of zero crossings for the further dial pulse digit and the portion fall within predetermined ranges.

5. A method for obtaining a template for use in detecting and identifying dial pulse digits in a telephone signal comprises the steps of:

detecting a series of pulses referred to as clicks which comprise one or more predetermined dial pulse digits;

analyzing the clicks of the one or more predetermined dial pulse digits to determine a predetermined set of data to provide the template, the data comprising a measure of energy, length, and number of zero crossings for each of the clicks; and storing the template.

6. An apparatus for detecting and identifying dial pulse digits in a telephone signal comprises:

detection means, responsive to the telephone signal, for detecting a series of pulses referred to as clicks which comprise a dial pulse "0" digit;

analysis means, responsive to output from the detection means, for analyzing clicks of the dial pulse "0" digit to determine a predetermined set of data to provide a template, the data comprising a measure of energy, length, and number of zero crossings for each of the clicks;

the detection means, being responsive to a further telephone signal, for detecting a series of clicks which comprise a further dial pulse digit;

the analysis means, being responsive to output from the detection means relating to the further dial pulse digit, for analyzing the clicks of the further dial pulse digit to determine a further predetermined set of data, the data comprising a measure of energy, length, and number of zero crossings for each of the clicks; and means for comparing the further predetermined set of data with the data comprising the template to identify the further dial pulse digit.

7. The method of claim 1 wherein the step of comparing comprises the steps of:

determining a sum of the length, a sum of the measure of energy, and a sum of the number of zero crossings for the clicks of the further dial pulse digit;

selecting a portion of the template by determining a sum of the length of clicks until finding data for clicks having a sum which is close, to within a predetermined degree, to the sum of the length for the clicks of the further dial pulse digit; and identifying the further dial pulse digit utilizing the number of clicks and the sums for the further dial pulse digit and data from the portion.

8. The method of claim 7 wherein the step of identifying the further dial pulse digit comprises determining whether a ratio of the sum of the measure of energy and a ratio of the sum of the number of zero crossings for the further dial pulse digit and the portion fall within predetermined ranges.

9. The method of claim 1 wherein the step of analyzing the clicks of the one or more predetermined dial pulse digits comprises the step of eliminating data pertaining to connect and/or disconnect clicks from the template and wherein the step of analyzing the clicks of the further dial pulse digit further comprises eliminating data pertaining to connect and/or disconnect clicks from the predetermined set of data.

10. The method of claim 2 wherein the step of analyzing the clicks of the dial pulse "0" digit comprises the step of eliminating data pertaining to connect and/or disconnect clicks from the template and wherein the step of analyzing the clicks of the further dial pulse digit further comprises eliminating data pertaining to connect and/or disconnect clicks from the predetermined set of data.

11. The method of claim 9 wherein the step of eliminating a connect click comprises the step of eliminating a first click detected for a dial pulse digit if the sum of the lengths of the first two clicks detected for the digit are greater than a first predetermined threshold and wherein the step of eliminating a disconnect click comprises the step of eliminating a last click detected for a dial pulse digit if the sum of the lengths of the last two clicks detected for the digit are greater than a second predetermined threshold.

12. The method of claim 5 which further comprises the steps of storing a telephone identifier of a caller whose telephone generated the predetermined dial pulse digits.

* * * * *